United States Patent
Lee et al.

(10) Patent No.: US 8,808,913 B2
(45) Date of Patent: Aug. 19, 2014

(54) COMPOSITE POSITIVE ELECTRODE ACTIVE MATERIAL, ELECTRODE FOR LITHIUM SECONDARY BATTERY INCLUDING COMPOSITE POSITIVE ELECTRODE ACTIVE MATERIAL, AND LITHIUM SECONDARY BATTERY

(71) Applicant: Samsung Fine Chemicals Co., Ltd, Ulsan (KR)

(72) Inventors: Mi Sun Lee, Asan (KR); Pil Sang Yun, Asan (KR); Doo Kyun Lee, Asan (KR); Yun Ju Cho, Asan (KR); Shin Jung Choi, Asan (KR)

(73) Assignee: Samsung Fine Chemicals Co., Ltd, Ulsan (KR)

( * ) Notice: Subject to any disclaimer, the term of this patent is extended or adjusted under 35 U.S.C. 154(b) by 111 days.

(21) Appl. No.: 13/729,948

(22) Filed: Dec. 28, 2012

(65) Prior Publication Data
US 2013/0252100 A1    Sep. 26, 2013

(30) Foreign Application Priority Data
Mar. 23, 2012    (KR) ........................ 10-2012-0030122

(51) Int. Cl.
| | | |
|---|---|---|
| *H01M 4/50* | (2010.01) | |
| *H01M 4/62* | (2006.01) | |
| *H01M 4/505* | (2010.01) | |
| *H01M 4/131* | (2010.01) | |
| *H01M 4/525* | (2010.01) | |
| *H01M 4/485* | (2010.01) | |
| *H01M 4/02* | (2006.01) | |
| *H01M 10/052* | (2010.01) | |

(52) U.S. Cl.
CPC ........ *H01M 4/485* (2013.01); *H01M 2004/021* (2013.01); *H01M 4/625* (2013.01); *H01M 4/505* (2013.01); *H01M 10/052* (2013.01); *Y02E 60/122* (2013.01); *H01M 4/622* (2013.01); *H01M 4/131* (2013.01); *H01M 4/525* (2013.01)

USPC .......................................... 429/224; 429/217

(58) Field of Classification Search
CPC .... Y02E 60/122; H01M 4/505; H01M 4/525; H01M 10/0525; H01M 4/131; H01M 4/485; H01M 10/052; H01M 4/366; H01M 4/364; H01M 4/625; H01M 4/622; H01M 4/621
USPC ................ 429/206, 217, 220, 221, 223, 224, 429/231.9, 231.95
See application file for complete search history.

(56) References Cited

U.S. PATENT DOCUMENTS

| | | | |
|---|---|---|---|
| 8,277,974 B2 * | 10/2012 | Kumar et al. ................. | 429/206 |
| 2009/0305131 A1 * | 12/2009 | Kumar et al. ................. | 429/206 |
| 2010/0119942 A1 * | 5/2010 | Kumar ......................... | 429/220 |
| 2013/0004847 A1 * | 1/2013 | Kumar et al. ................. | 429/220 |
| 2013/0183579 A1 * | 7/2013 | Kim et al. .................... | 429/206 |

FOREIGN PATENT DOCUMENTS

JP    2004-103546    4/2004

OTHER PUBLICATIONS

Korean Office Action mailed Sep. 25, 2013 in corresponding Korean Application No. 10-2012-0030122.
W. C. West et al., "Electrochemical Behavior of Layered Solid Solution $Li_2MnO_3$-$LiMO_2$ (M = Ni, Mn, Co) Li-Ion Cathodes with and without Alumina Coatings", Journal of the Electrochemical Society, vol. 158, No. 8, 2011, pp. A883-A889.

\* cited by examiner

*Primary Examiner* — Stewart Fraser
(74) *Attorney, Agent, or Firm* — Osha Liang LLP

(57) ABSTRACT

Provided are a composite positive electrode active material, an electrode for a lithium secondary battery including the composite positive electrode active material, and a lithium secondary battery, and more particularly, a composite positive electrode active material including lithium composite oxide, activated carbon, and carbon black, an electrode for a lithium secondary battery including the composite positive electrode active material, and a lithium secondary battery. The present disclosure may provide a lithium secondary battery having improved rate characteristics in a low-temperature atmosphere.

7 Claims, No Drawings

COMPOSITE POSITIVE ELECTRODE ACTIVE MATERIAL, ELECTRODE FOR LITHIUM SECONDARY BATTERY INCLUDING COMPOSITE POSITIVE ELECTRODE ACTIVE MATERIAL, AND LITHIUM SECONDARY BATTERY

CROSS-REFERENCE TO RELATED APPLICATION

This application claims the foreign priority benefit of Korean Patent Application No. 10-2012-0030122 filed on Mar. 23, 2012, in the Korean Intellectual Property Office, the disclosure of which is incorporated herein by reference.

BACKGROUND

1. Field

Embodiments relate to a composite positive electrode active material, an electrode for a lithium secondary battery including the composite positive electrode active material, and a lithium secondary battery.

2. Description of the Related Art

Since the miniaturization, lightness, and high performance of portable electronic communication devices, such as camcorders, mobile phones, and notebooks, have been rapidly progressed, demands for miniaturization and high energy density characteristics of lithium secondary batteries used as power sources for driving these portable electronic communication devices have also been increased. Also, an application range of lithium secondary battery recently becomes extended to an automotive battery and a power source for lithium secondary battery hybrid electric vehicles, and in order to apply lithium secondary batteries to such sectors, improvements in low-temperature/high-temperature characteristics and high capacity power characteristics are not only required, but economic factors of price must also be considered.

In general, a lithium secondary battery is classified as a lithium sulfur battery using a sulfur-based material as a positive electrode active material and a lithium ion battery using lithiated transition metal oxide as a positive electrode active material. Due to the low electrical conductivity of metal oxide used as a positive electrode active material, the lithium ion battery includes a conductive agent for smooth supply of electrons between metal oxides or between an electrode collector and a surface of the positive electrode active material and a binder for fixing these materials to the electrode collector. A configuration between the metal oxide, the conductive agent, and the binder significantly affects battery performance and reliability.

The positive electrode active material is a main component affecting battery performance and safety, and lithium composite metal oxides are used as the positive electrode active material. Recently, a great deal of research into layered oxides among the lithium composite metal oxides has been conducted due to their high capacities. However, with respect to a high-capacity positive electrode active material, $y\text{Li}_2\text{MnO}_3\text{-}(1-y)\text{LiMO}_2$ (0<y<1) lithium metal oxide, it may be difficult to be used as an automotive battery, because lifetime of an electrode, low-temperature/high-temperature stability, and high-rate discharge efficiency may be low.

Accordingly, in order to improve high-rate discharge efficiency and low-temperature/high-temperature stability, oxides for a positive electrode active material, such as a positive electrode active material, in which a surface of $y\text{Li}_2\text{MnO}_3\text{-}(1-y)\text{LiMO}_2$ (0<y<1)-based oxide is coated with lithium transition metal oxide, and layered lithium transition metal oxide, have been suggested. However, technical difficulties in stably obtaining power characteristics in a low-temperature atmosphere remain.

SUMMARY

An aspect of the present invention provides a composite positive electrode active material capable of providing excellent charge and discharge characteristics and high capacity in a low-temperature atmosphere due to its improved low-temperature characteristics as well as excellent battery stability, an electrode for a lithium secondary battery including the composite positive electrode active material, and a lithium secondary battery.

According to at least one of embodiments, a composite positive electrode active material includes 80 to 98 parts by weight of a positive electrode active material expressed by the following Chemical Formula 1, 1 to 15 parts by weight of activated carbon, and 1 to 5 parts by weight of carbon black, based on 100 parts by weight of the composite positive electrode active material, wherein a specific surface area of the activated carbon is in a range of 800 m²/g to 3000 m²/g and a specific surface area of the carbon black is in a range of 1000 m²/g to 2000 m²/g:

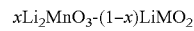  [Chemical Formula 1]

where M is one or more selected from the group consisting of magnesium (Mg), nickel (Ni), cobalt (Co), chromium (Cr), aluminum (Al), vanadium (V), iron (Fe), copper (Cu), zinc (Zn), titanium (Ti), strontium (Sr), manganese (Mn), boron (B), and lanthanum (La), and 0<x<1.

A mixing ratio (w/w) of the carbon black to the activated carbon may be in a range of 1:0.2 to 1:15.

According to another embodiment, an electrode for a lithium secondary battery includes the composite positive electrode active material and a binder.

According to another embodiment, a lithium secondary battery includes the electrode for a lithium secondary battery.

DETAILED DESCRIPTION

Korean Patent Application No. 10-2012-0030122 filed on Mar. 23, 2012, in the Korean Intellectual Property Office, and entitled: "Composite Positive Electrode Active Material, Electrode for Lithium Secondary Battery Including Composite Positive Electrode Active Material, and Lithium Secondary Battery" is incorporated by reference herein in its entirety.

Hereinafter, the present disclosure will be described in more detail.

Embodiments provide a composite positive electrode active material including lithium metal oxide. Low-temperature characteristics of the composite positive electrode active material are improved and thus, may exhibit high capacity during charge and discharge in a low-temperature atmosphere and may provide a lithium secondary battery having excellent battery stability.

The composite positive electrode active material includes lithium metal oxide, activated carbon, and carbon black.

The lithium metal oxide is expressed by the following Chemical Formula 1:

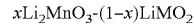  [Chemical Formula 1]

where M is one or more selected from the group consisting of magnesium (Mg), nickel (Ni), cobalt (Co), chromium (Cr), aluminum (Al), vanadium (V), iron (Fe), copper (Cu), zinc (Zn), titanium (Ti), strontium (Sr), manganese (Mn), boron (B), and lanthanum (La), and may be Ni, Co, and Mn, and $0<x<1$.

The lithium metal oxide is included in an amount ranging from 80 to 98 parts by weight based on 100 parts by weight of the composite positive electrode active material and may be included in an amount ranging from 90 to 98 parts by weight. When a content of the lithium metal oxide is included within the foregoing range, uniform mixing with activated carbon and carbon black is achieved, and thus, battery stability may be further improved while electrical conductivity is improved and high capacity is provided in a low-temperature atmosphere.

The activated carbon and carbon black are used as a conductive agent, and improve electrical conductivity of the positive electrode active material and prevent degradation of battery characteristics in a low-temperature atmosphere. A specific surface area of the carbon black is in a range of 1000 $m^2/g$ to 2000 $m^2/g$ and may be in a range of 1000 $m^2/g$ to 1500 $m^2/g$. Also, a specific surface area of the activated carbon is in a range of 800 $m^2/g$ to 3000 $m^2/g$ and may be in a range of 800 $m^2/g$ to 1500 $m^2/g$. When the specific surface areas of the carbon black and the activated carbon are included within the foregoing ranges, smooth supply of electrons may be possible because a contact range between the composite positive electrode active material and an electrolyte is increased, and formation of the composite may be facilitated because mixing with the positive electrode active material is well achieved.

The carbon black is included in an amount ranging from 1 to 5 parts by weight based on 100 parts by weight of the composite positive electrode active material and the activated carbon is included in an amount ranging from 1 to 15 parts by weight based on 100 parts by weight of the composite positive electrode active material. A total weight ratio of the carbon black and the activated carbon may be in a range of 1 to 20 parts by weight based on 100 parts by weight of the positive electrode active material. When a total content of the carbon black and the activated carbon included is within the foregoing range, low-temperature characteristics of a battery may be improved and when the total content thereof is deviated from the foregoing range, volume capacity of the battery may decrease.

A mixing ratio (w/w) of the carbon black to the activated carbon may be in a range of 1:0.2 to 1:15 and may be in a range of 1:0.5 to 1:3, and for example, may be in a range of 1:0.5 to 1:2. When the mixing ratio of the carbon black to the activated carbon is within the foregoing range, electrical conductivity and low-temperature characteristics of a positive electrode are improved, and thus, high capacity may be obtained in a low-temperature atmosphere.

The composite positive electrode active material may be prepared by using a dry method, in which lithium metal oxide and activated carbon and carbon black are mixed by ball milling or using a mortar, and a wet method, in which lithium metal oxide and activated carbon and carbon black are dispersed and mixed in a solvent and dried. The dry method may be used to prepare the composite positive electrode active material.

The present disclosure provides an electrode for a lithium secondary battery including the composite positive electrode active material.

The electrode for a lithium secondary battery may be prepared in such a manner that a positive electrode collector is coated with a composition for forming a positive electrode active material including a composite positive electrode active material and a binder and dried, and then pressed.

The binder functions to bond between the composite positive electrode active materials and to fix the composite positive electrode active materials to the electrode collector, and any binder used in the art may be used without limitation. The binder may be one or more selected from the group consisting of polyvinylidene fluoride, polytetrafluoroethylene, polyvinylchloride, polyvinylpyrrolidone, polyvinyl alcohol, carboxymethyl cellulose (CMC), starch, hydroxypropyl cellulose, polyethylene, polypropylene, a styrene-butadiene rubber, and a fluoro rubber. The binder may be prepared by selectively diluting with a solvent such as N-methyl-2-pyrrolidone (NMP).

In the composition, a mixing ratio (w/w) of the composite positive electrode active material to the binder may be in a range of 90:10 to 98:2 and for example, may be in a range of 97:3 to 96:4. When the mixing ratio is within the foregoing range, a bonding force between the positive electrode active material and the electrode collector may be increased, and thus, delamination of a composite positive electrode active material layer due to the insufficient bonding force may be prevented and an increase in electrical resistance due to the binder, an insulator, may be prevented.

The positive electrode collector may be copper, stainless steel, aluminum, nickel, titanium, and baked carbon; copper and stainless steel surface treated with carbon, nickel, titanium, or silver; and an aluminum-cadmium alloy, and various shapes, such as film, sheet, foil, net, porous body, foamed body, and nonwoven fabric, may be used.

The present disclosure provides a lithium secondary battery including the electrode for a lithium secondary battery.

Since the lithium secondary battery is composed of the composite positive electrode active material according to the present disclosure, characteristics of the battery may be stably manifested at low temperatures and high capacity may be obtained, and thus, the lithium secondary battery may be used in an apparatus requiring high current and high power.

The lithium secondary battery uses the electrode for a lithium secondary battery as a positive electrode and in addition, may further include a negative electrode, a separator, and a non-aqueous electrolyte solution. Structure and preparation method of the lithium secondary battery may be appropriately selected so long as they are well known in the art and are not deviated from the scope of the present disclosure.

For example, the negative electrode may be prepared by coating a negative electrode collector with a composition for forming a negative electrode active material including a negative electrode active material and drying. Also, with respect to a coin half cell, the negative electrode may be lithium.

The composition for forming a negative electrode active material may further selectively include a binder or a conductive agent. The negative electrode active material may include a carbonaceous material, such as artificial graphite, natural graphite, graphitized carbon fibers, and amorphous carbon, lithium, alloys between lithium and silicon (Si), Al, tin (Sn), lead (Pb), Zn, bismuth (Bi), indium (In), Mg, gallium (Ga), or cadmium (Cd), an alloyable metallic compound such as Sn alloy and Al alloy, and a composite including the metallic compound and the carbonaceous material.

The negative electrode collector may be copper, stainless steel, aluminum, nickel, titanium, and baked carbon; copper and stainless steel surface treated with carbon, nickel, titanium, or silver; and an aluminum-cadmium alloy, and various shapes, such as film, sheet, foil, net, porous body, foamed body, and nonwoven fabric, may be used.

The separator is disposed between the negative electrode and the positive electrode, and may be an olefin-based polymer, such as polypropylene, and a sheet or nonwoven fabric formed of glass fibers or polyethylene.

An electrolyte solution having a lithium salt dissolved in a non-aqueous solvent may be used as the non-aqueous electrolyte solution, and the lithium salt may be LiCl, LiBr, LiI, LiClO$_4$, LiBF$_4$, LiB$_{10}$OCl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, and (CF$_3$SO$_2$)$_2$NLi, or chloroborane lithium.

The non-aqueous electrolyte solution may include a non-aqueous organic solvent, an organic solid electrolyte, or an inorganic solid electrolyte. Examples of the non-aqueous organic solvent may be ethylene carbonate, propylene carbonate, butylene carbonate, vinylene carbonate, dimethyl carbonate, methylethyl carbonate, diethyl carbonate, methyl acetate, ethyl acetate, propyl acetate, methyl propionate, ethyl propionate, γ-butyrolactone, 1,2-dimethoxyethane, tetrahydrofuran, 1,2-dioxane, 2-methyltetrahydrofuran, acetonitrile, dimethylformamide, N-methyl-2-pyrrolidone, dimethyl sulfoxide, 1,3-dimethyl-2-imidazolidinone, sulfolane, methylsulfolane, or mixtures thereof.

The organic solid electrolyte may be a gel-type polymer electrolyte in which a polymer electrolyte, such as polyethylene oxide and polyacrylonitrile, is impregnated with an electrolyte solution.

Examples of the inorganic solid electrolyte may be nitrides, halides, or sulfates of Li, such as Li$_3$N, LiI, Li$_5$NI$_2$, Li$_3$N—LiI—LiOH, LiSiO$_4$, LiSO$_4$—LiI—LiOH, Li$_2$SiS$_3$, Li$_4$SiO$_4$, Li$_4$SiO$_4$—LiI—LiOH, and Li$_3$PO$_4$—Li$_2$S—SiS$_2$.

Hereinafter, the present disclosure will be described in more detail according to the following examples and comparative example. However, the following examples are merely presented to exemplify the present disclosure, and the protective scope of the present disclosure is not limited thereto.

Example 1

(1) Composite Positive Electrode Active Material

Positive electrode active material, activated carbon, and carbon black according to contents described in Table 1 were dry mixed by a mortar for 30 minutes to prepare a composite positive electrode active material.

(2) Electrode of Lithium Secondary Battery 97 wt % of the composite positive electrode active material and 3 wt % of polyvinylidene fluoride (PVDF) dissolved at a concentration of 6 wt % in N-methyl-2-pyrrolidone (NMP) were mixed to prepare a slurry and then a thin aluminum plate was coated with the slurry. Next, an electrode for a lithium secondary battery including the composite positive electrode active material for a lithium secondary battery was prepared by performing a compaction treatment through a roll press.

(3) Lithium Secondary Battery

A coin-type lithium secondary battery including the prepared electrode and composed of a negative electrode (lithium, FMC), a separator (polypropylene (PP), Celgard), and a lithium electrolyte solution (1.3 M LiPF$_6$ in ethylene carbonate (EC): ethylmethyl carbonate (EMC): diethyl carbonate (DEC)=3:2:5, Panaxetec) was prepared.

Examples 2 to 4

Lithium secondary batteries were prepared in the same manner as Example 1 except that components and contents described in Table 1 were used.

Comparative Example 1

A lithium secondary battery was prepared in the same manner as Example 1 except that components and contents described in Table 1 were used.

Experimental Example

Low-Temperature Characteristics

The batteries were prepared as coin cells and the coin cells were then subjected to 1 cycle of charge and discharge at 0.1 C at room temperature. At −30° C., the coin cells were subjected to 1 cycle of charge and discharge at 0.2 C, 1 cycle of charge and discharge at 1 C, and 2 cycles of charge and discharge at 2 C, and then ratios of capacities obtained at 2 C to those obtained at 0.2 C were measured and the results thereof are presented in Table 1.

TABLE 1

| | Components (wt %) | Example 1 | Example 2 | Example 3 | Example 4 | Comparative Example 1 |
|---|---|---|---|---|---|---|
| Composite positive electrode active material | Li$_2$MnO$_3$—LiMO$_2$ | 97 | 98 | 97 | 80 | 97 |
| | Carbon black | 2 | 1 | 1 | 5 | — |
| | Activated carbon | 1 | 1 | 2 | 15 | — |
| | Super P | — | — | — | — | 3 |
| | Carbon black:Activated carbon | 1:0.5 | 1:1 | 1:2 | 1:3 | — |
| Electrode composition | Composite positive electrode active material | 97 | 97 | 97 | 97 | 97 |
| | Binder | 3 | 3 | 3 | 3 | 3 |
| Battery capacity (mAh/g) | | 135 | 123 | 130 | 119 | 108 |
| Rate characteristics (2/0.2 C, −30° C., %) | | 85 | 76 | 80 | 50 | 55 |

Descriptions Related to the Components Listed in Table 1

(1) 0.82 LiNi$_{0.58}$Co$_{0.20}$Mn$_{0.22}$O$_2$·0.18 Li$_2$MnO$_3$ (2) Carbon black: specific surface area 1250 m$^2$/g (3) Activated carbon: specific surface area 1000 m$^2$/g Referring to Table 1, it may be confirmed that low-temperature characteristics of the composite positive electrode active material according to the present disclosure are improved to thus provide excellent rate characteristics during charge and discharge at −30° C.

Low-temperature characteristics of a composite positive electrode active material according to the present disclosure are improved and thus, a lithium secondary battery having improved charge and discharge efficiency and high capacity in a low-temperature atmosphere may be provided. Also, since the composite positive electrode active material according to the present disclosure has high capacity and excellent low-temperature/high-temperature characteristics, lithium secondary batteries applicable to power sources for portable electronic products and automobiles may be provided.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A composite positive electrode active material comprising:
    80 to 98 parts by weight of a positive electrode active material expressed by the following Chemical Formula 1;
    1 to 15 parts by weight of activated carbon; and
    1 to 5 parts by weight of carbon black, based on 100 parts by weight of the composite positive electrode active material,
    wherein a specific surface area of the activated carbon is in a range of 800 m²/g to 3000 m²/g and a specific surface area of the carbon black is in a range of 1000 m²/g to 2000 m²/g:

$x\text{Li}_2\text{MnO}_3\text{-}(1-x)\text{LiMO}_2$  [Chemical Formula 1]

where M is one or more selected from the group consisting of magnesium (Mg), nickel (Ni), cobalt (Co), chromium (Cr), aluminum (Al), vanadium (V), iron (Fe), copper (Cu), zinc (Zn), titanium (Ti), strontium (Sr), manganese (Mn), boron (B), and lanthanum (La), and 0<x<1.

2. The composite positive electrode active material as claimed in claim 1, wherein a mixing ratio (w/w) of the carbon black to the activated carbon is in a range of 1:0.2 to 1:15.

3. The composite positive electrode active material as claimed in claim 1, wherein the mixing ratio (w/w) of the carbon black to the activated carbon is in a range of 1:0.2 to 1:3.

4. An electrode for a lithium secondary battery comprising the composite positive electrode active material of claim 1 and a binder.

5. The electrode for a lithium secondary battery as claimed in claim 4, wherein the binder is one or more selected from the group consisting of polyvinylidene fluoride, polytetrafluoroethylene, polyvinylchloride, polyvinylpyrrolidone, polyvinyl alcohol, carboxymethyl cellulose (CMC), starch, hydroxypropyl cellulose, polyethylene, polypropylene, a styrene-butadiene rubber, and a fluoro rubber.

6. The electrode for a lithium secondary battery as claimed in claim 4, wherein a mixing ratio (w/w) of the composite positive electrode active material to the binder is in a range of 90:10 to 98:2.

7. A lithium secondary battery comprising the electrode for a lithium secondary battery of claim 4.

* * * * *